Figure 1:
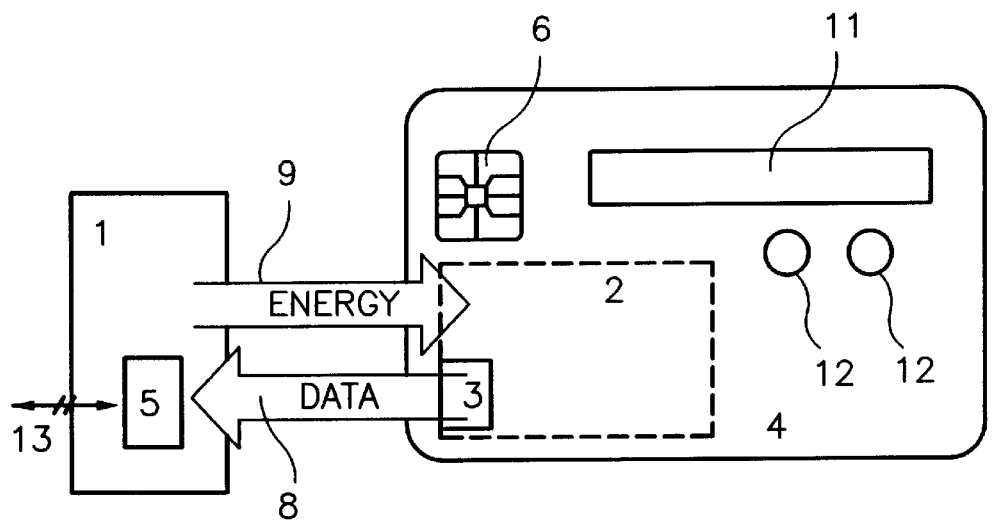

United States Patent [19]
Kreft

[11] Patent Number: 6,068,193
[45] Date of Patent: May 30, 2000

[54] PROCESS FOR EXCHANGING ENERGY AND DATA BETWEEN A READ/WRITE TERMINAL AND A CHIP CARD WITH CONTACTLESS CONNECTIONS AND/OR CONTACT CONNECTIONS AS WELL AS A DEVICE FOR THIS PURPOSE

[75] Inventor: Hans-Diedrich Kreft, Dassendorf, Germany

[73] Assignee: Angewandte Digital Elektronik GmbH, Dassendorf, Germany

[21] Appl. No.: 08/973,741
[22] PCT Filed: Jan. 30, 1996
[86] PCT No.: PCT/DE96/00158
  § 371 Date: Dec. 11, 1997
  § 102(e) Date: Dec. 11, 1997
[87] PCT Pub. No.: WO96/24112
  PCT Pub. Date: Aug. 8, 1996

[30] Foreign Application Priority Data

Feb. 3, 1995 [DE] Germany .................. 195 03 607

[51] Int. Cl.⁷ .................................................. G06K 19/06
[52] U.S. Cl. ............................................ 235/492; 235/493
[58] Field of Search .................................. 235/492, 487, 235/486, 441, 493, 449

[56] References Cited

U.S. PATENT DOCUMENTS

| 4,575,621 | 3/1986 | Dreifus ...................... 235/380 |
| 4,701,601 | 10/1987 | Francini et al. .............. 235/449 |
| 4,868,376 | 9/1989 | Lessin et al. ................ 235/492 |
| 5,206,495 | 4/1993 | Kreft ........................ 235/492 |
| 5,847,372 | 12/1998 | Kreft ........................ 235/492 |

FOREIGN PATENT DOCUMENTS

| 0203683 | 12/1986 | European Pat. Off. . |
| 0373411 | 6/1990 | European Pat. Off. . |
| 0534559 | 3/1993 | European Pat. Off. . |
| 0554830 | 8/1993 | European Pat. Off. . |
| 3935364 | 8/1990 | Germany . |
| 4327334 | 1/1995 | Germany . |

*Primary Examiner*—Thien M. Le
*Assistant Examiner*—Daniel H. Sherr
*Attorney, Agent, or Firm*—Horst M. Kasper

[57] ABSTRACT

Chip cards are described which remotely transfer the information of magnetic strip cards without contact to chip card terminals.

47 Claims, 1 Drawing Sheet

PROCESS FOR EXCHANGING ENERGY AND DATA BETWEEN A READ/WRITE TERMINAL AND A CHIP CARD WITH CONTACTLESS CONNECTIONS AND/OR CONTACT CONNECTIONS AS WELL AS A DEVICE FOR THIS PURPOSE

DESCRIPTION

According to the generic part of the patent claim, the invention relates to chip cards (4) and their terminals (1) which contact-free and/or via contact connections exchange data and energy with chip cards.

Chip cards are known which—with or without contacts—exchange energy and data with their terminals (read/write devices). These cards are used for numerous applications such as, for example, telephone cards, medical cards, access control cards. An overview of such cards and their applications is compiled in three editions of the German publication Elektronik of the year 1993. A chip card is known from DE 39 35 364 C1 which contains contacts and contact-free transmission elements.

The invention is based on the objective of making the information transfer and information reception by chip cards comparable to that of todays magnetic strip cards. According to the invention, it should also be possible to generate the usual data formats of the type used nowadays on the magnetic strips of magnetic strip cards by chip cards that function contact-free, also with the contact-free transfer of information. Moreover, the information that is transferred contact-free should be transferred in a certain logical form (protocol) or physical modulation form in such a way that a clear recognition of the information and its content is reproducibly possible in the same manner for different devices. Due to this form of reproducibility of the contactless information transfer, it should be possible for the information of different cards to be interpreted in the same manner by different terminals. Moreover, it should be possible to load security codes anew by means of contact segments into the information provided contact-free.

These objectives are achieved by the features indicated in the claims.

FIG. 1 schematically shows the terminal (1) with the electronic memory (5) as well as a data line (13) to a remotely located device. Reference numeral (4) refers to the chip card containing an electronic circuit (2) which autonomously activates itself in an electromagnetic field. Reference numeral (9) stands for the energy fed in electromagnetically, numeral (8) designates the information flow that has been transmitted by the chip card (4) to the terminal (1) without contact. Numeral (3) refers to the part of the circuit arrangement (2) that, according to the invention, can exclusively transfer the data without contact and exclusively receive data via the contacts (6) or the two coils (12). Numeral (11) refers to a magnetic strip.

Figure 2:
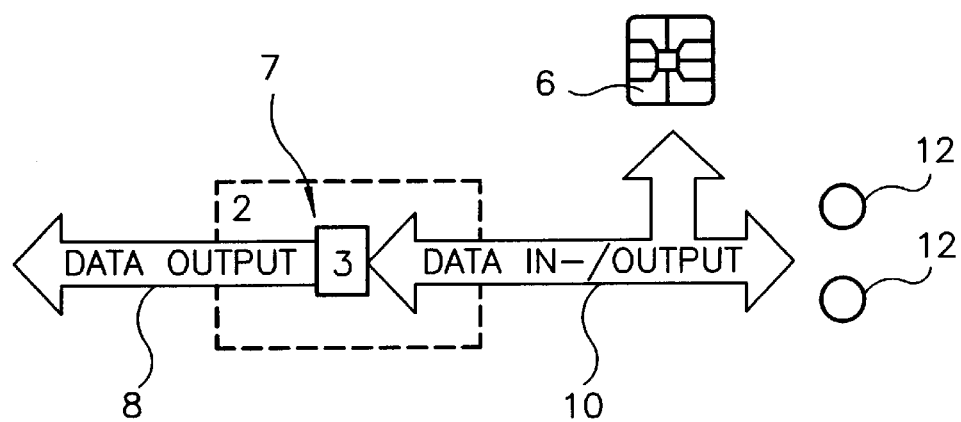

FIG. 2 with the designation (7) represents the electromagnetic contact-free feed of energy as the source of the contact-free sending of data (8) by the component (3). Numeral (10) designates the bi-directional exchange of data of the component (3) via the contacts (6) or coils (12).

The invention relates to terminals (1) for exchanging data and energy with chip cards (4) (Smartcards) which can function in various alternative versions, namely, with contact, without contact as well as with and without contact. The chip cards stand out for the fact that a part of their electronic component (2) autonomously activates itself in an external electromagnetic field when a certain energy density is reached. Once the card has been activated, it can electromagnetically transfer information from its component (3) (e.g. from an electronic memory) contact-free or optionally it can receive information. The transferred information includes information/data (8) of the type transferred on conventional magnetic strips (11). Thus, according to the invention, a chip card that functions contact-free sends out information to its terminal, whereby said information corresponds to the information content of magnetic strip cards. On the basis of this information (8), the terminal (1) can precisely generate the data in terms of form and content in the way that a magnetic strip card would also generate it when read by a magnetic reading head in a magnetic strip reading device. This data can be stored in the memory (5) of the terminal (1) or made available to other remotely located devices via a data line (6).

According to this description, it is possible to manually hold chip cards (4) in close proximity to terminals (1) and to have these terminals transfer data from the chip card in the same form as they are already transferred nowadays by magnetic strip reading devices. A remotely located device is not capable of ascertaining whether the magnetic strip code received comes from a magnetic strip card (11) or from the memory (3) of a chip card.

Loading specific data (10) of a magnetic strip card into the part (2) of the electronic chip card that is activated by means of electromagnetic energy transmission takes place via the contacts (6) of a chip card. The loading of contact cards, which is protected against misuse, is already used for health data or telephone units and can be used for reading in magnetic strip information. Loading the magnetic strip code via this secured contact segment ensures that magnetic strip data cannot be loaded into the card in an unsecured manner.

If a possibility also exists to remotely change the memory of contact-free chip cards (7), it is fundamentally not possible to determine whether data has been entered into a card memory without the knowledge of the card owner. Such a card memory (3) can have been intentionally altered for purposes of misuse, or else interference might have coincidentally changed a memory remotely (7) without the card owner realizing this. According to DE 43 27 334, it is known that a card with two coils (12) can autonomously ascertain whether it is in close proximity to a transmitter. According to the patent, two coils (12) are used in a card for reading in magnetic strip information. In this case, the same security against unnoticed changing of the memory can be achieved as is ensured with contact cards. Security algorithms can be used in the same way as they are used for contact cards. Contact-free loading via two coils (12) has the advantage that the error-prone contacts (6) are no longer needed as security-relevant components, since two coils can offer the same level of security while being less error-prone.

When the card (4) is activated electromagnetically, by utilizing only one coil, an electronic circuit arrangement in the part (2) can ensure that no contact-free influence (7) or change of the memory on the card, can occur. The circuit arrangement (2) can be configured in such a way that, with the electromagnetic feed of energy (9), no data can be read into the memory (3). For example, the electronic component (2) can indicate whether the source of the supply voltage is the coils (12) or the contacts (6). In this manner, it is ensured that these cards can only be reloaded in card terminals via contacts 6. In this case, cards are needed that can function with contacts as well as without contact. Such cards are described in DE 39 35 364. The process described here according to the patent serves to secure the storing of data in cards in the same manner as is the case with monetary information on cards. The use of the card is protected, for example, by the entry of a PIN code by the card owner.

It is described here that the activation of the chip card via contacts (6) also simultaneously activates the contact-free transmission (8). In this manner, it is possible to check the output (8) of the magnetic strip data to see if it matches the feed (10) into one and the same device and to test it for flawless functioning without being dependent on the contact-free feed of energy (9).

The magnetic strip information can also be read out via the contacts of a chip card. In this way, there is no need for the complicated transport mechanisms for magnetic strip cards in contact reading devices.

If cards are being utilized which contain exclusively magnetic strips, they can only be read via the suitable magnetic strip reading devices. If these devices additionally contain contact-free reading devices, the users of contact-free cards no longer have to insert their cards into the reading slot and they do not have to decide how to slide in the card, since the contact-free reading takes place irrespective of the position.

There are different magnetic strip cards on the market. For instance, time recording by means of cards uses different magnetic strip tracks and data formats than credit cards. If these different types of information are stored in the memory of the chip card, they can be output via the contact-free segment so that the terminal can determine whether the necessary information is contained in the data transferred. Accordingly, it is possible to use the information of a chip card, for example, for a bank transaction at one time and for a time record at another time.

When the card is used in a chip card terminal (1), new data can be written into the memory (3) of the card, which is used to encode the data that is present there in the form of magnetic strip card information. The information that was transferred contact-free is encoded anew each time the card is used in a terminal (1) (for example, a bank terminal). Thus, the retrieval of information that was transferred contact-free can only be of significance until the next time the card is used in a terminal.

Terminals are described which make it possible to read the information of the magnetic strip (11) of a card (4) and subsequently to read it into the card via contacts (6) or else contact-free. Since cards are normally provided with a magnetic strip which received its information in devices which do not have contacts or coils for chip cards, the magnetic strip information can be read into the memory (2) by means of this process.

Chip cards are described which do not contain any magnetic strips. The information of magnetic strips can be read out via contacts (6) or coils (12).

Cards are described which contain energy storage elements and are thus suitable for transferring their information contact-free remotely. Since these cards do not need to be fed with contact-free energy, the physical conditions for an optimal adaptation of coils and transmission segments do not have to be met. For example, frequencies that lie in the range of infrared light can be used for transmitting.

Cards are described which utilize condensers for contact-free transmission and, by the same token, are suited to transmit magnetic strip information to terminals (1) in a contact-free way.

I claim:

1. Process for exchanging energy and data between a read/write terminal (1) and a chip card (4) with contactless connections and with contact connections (6), wherein energy and magnetic strip data are transferred through contacts from the read/write terminal (1) to the chip card (4) with contact via the contact connections (6) and wherein energy and magnetic strip data are transferred without contact or with contact from the chip card (4) to the read/write terminal (1) by means of electromagnetic alternating fields when the chip card is near the read/write terminal or with contact via the contact connections (6) when the chip card (4) is inserted into the read/write terminal (1), and when the chip card (4) reaches a minimum value of the energy level of the electromagnetic alternating field of the read/write terminal (1), said chip card autonomously activates itself with at least one circuit part (2) of its electronic circuit, wherein upon activation, this circuit part (2) sends out information to the read/write terminal (1) without contact by means of electromagnetic oscillations, wherein the sent-out information contains the data whose content corresponds to the data/information contents of magnetic strip cards, so that when the chip card (4) is manually held in close proximity to a read/write terminal (1), it causes the terminal to transfer the data of the chip card (4) to remotely located devices in the same form as it is also transferred by magnetic strip card reading devices and, due to the fact that the transmitted information is identical or similar, wherein this remotely located device needs not distinguish whether the information comes from a magnetic strip card or from a chip card.

2. Process according to claim 1, characterized in that contactless reading in of the magnetic strip information (8) to be electromagnetically transferred takes place in the circuit part (2) of the chip card (4) via two coils (12) with which the chip card (4) can autonomously detect electronically whether it is in the vicinity of or far away from a read/write terminal (1) and, as a function of this detection, the reception of magnetic strip information to be entered is switched on or of.

3. Process according to claim 2, characterized in that when the circuit part (2) of the chip card (4) is activated via the contact connections (6), energy can be concurrently fed in through said contact connections for purposes of effectuating electromagnetic data transmission (8).

4. Process according to claim 1, characterized in that the circuit part (2) of the chip card (4), depending on the source of its activation, is arranged in such a way that, on the one hand, in the case of contact-free electromagnetic activation, the circuit part (2) exclusively transfers the data without contact, corresponding to magnetic strip card data from the component (3), whereby any form of contact-free storage of data into the component (3) is blocked by electronic circuit means inside the chip card (4), and on the other hand, upon activation through the contact connections (6) and/or via the two coils (12), the circuit part (2) is opened for reading in data corresponding to magnetic strip card data.

5. Process according to claim 1, characterized in that the data of the chip card (4) that is transferred without contact is transmitted to the read/write terminal (1) via a data line (13) to another, remotely located device which, due to the similarity of the data being transferred either from the magnetic strip (11) of the chip card (4) or from the component (3), cannot distinguish whether the information received comes from the magnetic strip (11) or from the component (3).

6. Process for exchanging energy and data between a read/write terminal (1) and a chip card (4) with contactless connections and optionally with additional contact connections (6), whereby enerqy and data are either transferred without contact between the read/write terminal (1) and the chip card (4) by means of electromagnetic alternating fields or with contact via the contact connections (6) when the chip card (4) is inserted into the read/write terminal (1), and when the chip card (4) reaches a minimum value of the energy level of the electromagnetic alternating field of the read/write terminal (1), said chip card autonomously activates itself with at least one circuit part (2) of its electronic circuit, characterized in that upon activation, this circuit part (2) sends out information to the read/write terminal (1) without contact by means of electromagnetic oscillations and optionally receives information, wherein the sent-out information contains the data whose content corresponds to the data/information contents of magnetic strip cards, so that when the chip card (4) is manually held in close proximity to a read/write terminal (1), it causes the terminal to transfer the data of the chip card (4) to remotely located devices in the same form as it is also transferred by magnetic strip card reading devices and, due to the fact that the transmitted information is identical or similar, this remotely located device is not capable of distinguishing whether the information comes from a magnetic strip card or from a chip card, wherein data is reloaded from the read/write terminal (1) into the chip card (4) via the contact connections (6) or via the electromagnetic alternating field of the read/write terminal (1), information for encoding the data to be output by the read/write terminal (1) can be loaded into the chip card (4) so that the coding of the contact-free, electromagnetically transmitted data changes as a function of the reloading.

7. Device consisting of a read/write terminal (1) for exchanging energy and data with a chip card (4) carrying out the process according to claim 14, characterized in that the read/write terminal (1) has means for energized connection and/or communication with the contact connections (6) and/or with the coils (12) or condensers of the chip card (4) as well as a magnetic strip reading device for reading the magnetic strip (11) of the chip card (4), and in this manner, magnetic strip formatted information can be written into the chip card via the contact connections (6) by means of the read/write terminal (1) and magnetic strip formatted information can be read from the magnetic strip (11) and can be read out of the chip card via the contact connections (6) and/or coils (12) and/or condensers by means of the read/write terminal (1).

8. Device according to claim 7, characterized in that the data of the chip card (4) from the data transmission (8) with or without contact is stored in the read/write terminal (1) in the same output channel into which the data from the magnetic strip (11) is also fed.

9. Device according to claim 7, characterized in that the component for data reception (10) either via contact connections (6) or the two coils (12) and for contactless data transmission (8) of the circuit part (2) of the chip card (4) has an electronic memory (3).

10. Device according to claim 7, characterized in that the component (3) of the chip card (4) contains data corresponding to several different codes of magnetic strip card data, so that the chip card (4) is suited to fulfill different requirements of different read/write terminals or different programs which are each associated with different encoding, and the chip cards can transfer the different coding via their contact-free segment.

11. Device according to claim 7, characterized in that the chip card (4) is a card with a magnetic strip (11) for receiving and reading magnetic strip card data in a known manner or else it is a card without a magnetic strip.

12. Device according to claim 7, characterized in that the chip card (4) is provided with additional energy storage elements such as, for example, condensers, batteries, accumulators in order to transfer the data which is to be output without contact over larger distances than would be possible with contact-free data transmission (8) by means of the electromagnetic alternating field (7) of the chip card (4).

13. A method for exchanging energy and data between a read/write terminal and a chip card having contactless connections, inserting a chip card into a read/write terminal;

transferring energy and magnetic strip data through contacts from the read/write terminal to the chip card;

holding the chip card manually in closed proximity to the read/write terminal;

allowing the chip card to reach a minimum value of the energy level of the electromagnetic alternating field of the read/write terminal;

transferring energy and magnetic strip data without contact from the chip card to the read/write terminal by means of electromagnetic alternating fields;

causing thereby the terminal to transfer the data of the chip card to remotely located devices in the same form as it is also transferred by magnetic strip card reading devices; autonomously activating said chip card by itself with at least one circuit part of the electronic circuit of the chip card;

sending out information upon activation of this circuit part to the read/write terminal without contact by means of electromagnetic oscillations, wherein the sent-out information contains the data whose content corresponds to the data/information contents of magnetic strip cards.

14. The method according to claim 13 for exchanging energy and data further comprising disabling this remotely located device from distinguishing whether the information comes from a magnetic strip card or from a chip card based on the fact that the transmitted information by the magnetic strip card and by the chip card is identical or similar.

15. The method according to claim 13 for exchanging energy and data further comprising furnishing additional contact connections to the read/write terminal and to the chip card;

transferring energy and data based on contact through the contact connections.

16. The method according to claim 13 for exchanging energy and data further comprising receiving information in the chip card based on the transferring of energy and data without contact between the read/write terminal and the chip card by means of electromagnetic alternating fields.

17. A chip card data exchange device comprising a chip card having a magnetic strip;

a read/write terminal having means for energized connection and/or communication with a member selected from the group consisting of contact connections of the chip card, coils of the chip card, and condensers of the chip card; and having a magnetic strip reading device for reading the magnetic strip of the chip card for exchanging energy and data with a chip card for writing magnetic strip formatted information into the chip card through contact connections of the chip card and for reading magnetic strip formatted information from the magnetic strip through the member selected from the group consisting of contact connections of the chip card, coils of the chip card, and condensers of the chip card.

18. The chip card data exchange device according to claim 17 further comprising an output channel, wherein the data of the chip card after a data transmission with or without contact are stored in the read/write terminal in the same output channel into which the data from the magnetic strip is also fed.

19. The chip card data exchange device according to claim 17 further comprising a component for data reception disposed in the read/write terminal and including an electronic memory, wherein the component for data reception either through contact connections or the coils and for contactless data transmission of the circuit part of the chip card delivers data to and removes data from the electronic memory.

20. The chip card data exchange device according to claim 17 wherein the chip card is a card with a magnetic strip for receiving and reading magnetic strip card data.

21. The chip card data exchange device according to claim 17 wherein the chip card is a card without a magnetic strip.

22. The chip card data exchange device according to claim 17 further comprising an additional energy storage element disposed on the chip card in order to transfer the data which is to be output by means of the electromagnetic alternating field of the chip card without contact over larger distances than would be possible with a contact-free data transmission.

23. The chip card data exchange device according to claim 17 wherein the additional energy storage element is a member selected from the group consisting of a condenser, a battery, an accumulator and combinations thereof.

24. A chip card data exchange device comprising a chip card having a magnetic strip;

a read/write terminal having means for energized connection and/or communication with a member selected from the group consisting of contact connections of the chip card, coils of the chip card, and condensers of the chip card; and having a magnetic strip reading device for reading the magnetic strip of the chip card for exchanging energy and data with a chip card, for reading information from the magnetic strip, for writing information into or reading information out of the chip card through the member selected from the group consisting of contact connections of the chip card, coils of the chip card, and condensers of the chip card;

a component of the chip card, wherein the component of the chip card contains data corresponding to several different codes of magnetic strip card data, so that the chip card is suited to fulfill different requirements of different read/write terminals or different programs which are each associated with different encoding, and wherein the chip card is constructed to transfer the different coding through a contact-free segment.

25. A chip card comprising a chip card substrate;

a contact connection disposed on the chip card substrate for entering magnetic strip type information into the chip card;

a contactless transfer element disposed on the chip card substrate, wherein the contact connection employing the contacts and the contactless transfer element employing emission of electromagnetic waves provide two separate reading paths for magnetic strip type information present on the chip card;

an electronic memory disposed on the chip card substrate;

a circuit part disposed on the chip card substrate.

26. The chip card according to claim 25 further comprising magnetic strip type information data stored in the electronic memory.

27. The chip card according to claim 25 wherein the contactless transfer element is a coil disposed on the chip card substrate.

28. The chip card according to claim 25 wherein the contactless transfer element is a condenser disposed on the chip card substrate.

29. The chip card according to claim 25 further comprising a magnetic strip disposed on the chip card substrate for receiving and reading magnetic strip type data.

30. The chip card according to claim 29 further comprising magnetic strip type information data stored in the electronic memory and in the magnetic strip, wherein the magnetic strip type information data in the magnetic strip and in the electronic memory are the same information data.

31. The chip card according to claim 25 further comprising a component of the chip card, wherein the component of the chip card contains data corresponding to several different codes of magnetic strip type data, so that the chip card is suited to fulfill different requirements of different read/write terminals or different programs which are each associated with different encoding, and wherein the chip card is constructed to transfer the different coding through a contact-free segment.

32. The chip card according to claim 25 further comprising an additional energy storage element disposed on the chip card in order to transfer the magnetic strip type data which is to be output by means of the electromagnetic alternating field of the chip card without contact over larger distances than would be possible with a contact-free data transmission.

33. The chip card according to claim 32 wherein the additional energy storage element is a member selected from the group consisting of a condenser, a battery, an accumulator and combinations thereof.

34. A chip card comprising a chip card substrate;

a magnetic strip (11) disposed on the chip card substrate;

a contact connection (6) disposed on the chip card substrate;

a coil (12) disposed on the chip card substrate;

a condenser disposed on the chip card substrate;

an electronic memory (3) disposed on the chip card substrate;

a circuit part (2) disposed on the chip card substrate, wherein the chip card is readable by a magnetic strip reading device for reading the magnetic strip of the chip card for exchanging energy and magnetic strip type data with a chip card, for reading magnetic strip type information from the magnetic strip, for writing magnetic strip type information into the chip card through the contact connection of the chip card, and for reading magnetic strip type information out of the chip card through a member selected from the group consisting of the contact connection of the chip card, the coil of the chip card, and the condenser of the chip card.

35. Device consisting of a read/write terminal (1) for exchanging energy and data with a chip card (4) carrying out the process according to claim 14, characterized in that the read/write terminal (1) has means for energized connection and/or communication with the contact connections (6) and/or with the coils (12) or condensers of the chip card (4) as well as a magnetic strip reading device for reading the magnetic strip (11) of the chip card (4), and in this manner, information can be read from the magnetic strip (11) and can be written into or read out of the chip card via the contact connections (6) and/or coils (12) and/or condensers by means of the read/write terminal (1), wherein data is reloaded from the read/write terminal (1) into the chip card (4) via the contact connections (6) or via the electromagnetic alternating field of the read/write terminal (1), information for encoding the data to be output by the read/write terminal (1) can be loaded into the chip card (4) so that the coding of the contact-free, electromagnetically transmitted data changes as a function of the reloading.

36. A method for exchanging energy and data between a read/write terminal and a chip card having contactless connections, inserting a chip card into a read/write terminal;

holding the chip card manually in closed proximity to the read/write terminal;

allowing the chip card to reach a minimum value of the energy level of the electromagnetic alternating field of the read/write terminal;

transferring energy and data without contact between the read/write terminal and the chip card by means of electromagnetic alternating fields;

causing thereby the terminal to transfer the data of the chip card to remotely located devices in the same form as it is also transferred by magnetic strip card reading devices;

autonomously activating said chip card by itself with at least one circuit part of the electronic circuit of the chip card;

sending out information upon activation of this circuit part to the read/write terminal without contact by means of electromagnetic oscillations, wherein the sent-out information contains the data whose content corresponds to the data/information contents of magnetic strip cards;

wherein data is reloaded from the read/write terminal (1) into the chip card (4) via the contact connections (6) or via the electromagnetic alternating field of the read/write terminal (1), information for encoding the data to be output by the read/write terminal (1) can be loaded into the chip card (4) so that the coding of the contact-free, electromagnetically transmitted data changes as a function of the reloading.

37. A chip card data exchange device comprising a chip card having a magnetic strip;

a read/write terminal having means for energized connection and/or communication with a member selected from the group consisting of contact connections of the chip card, coils of the chip card, and condensers of the chip card;

having a magnetic strip reading device for reading the magnetic strip of the chip card for exchanging energy and data with a chip card, for reading information from the magnetic strip, for writing information into or reading information out of the chip card through the member selected from the group consisting of contact connections of the chip card, coils of the chip card, and condensers of the chip card;

wherein data is reloaded from the read/write terminal (1) into the chip card (4) via the contact connections (6) or via the electromagnetic alternating field of the read/write terminal (1), information for encoding the data to be output by the read/write terminal (1) can be loaded into the chip card (4) so that the coding of the contact-free, electromagnetically transmitted data changes as a function of the reloading.

38. Process for exchanging energy and data between a read/write terminal (1) and a chip card (4) with contactless connections and optionally with additional contact connections (6), whereby energy and data are either transferred without contact between the read/write terminal (1) and the chip card (4) by means of electromagnetic alternating fields or with contact via the contact connections (6) when the chip card (4) is inserted into the read/write terminal (1), and when the chip card (4) reaches a minimum value of the energy level of the electromagnetic alternating field of the read/write terminal (1), said chip card autonomously activates itself with at least one circuit part (2) of its electronic circuit, characterized in that upon activation, this circuit part (2) sends out information to the read/write terminal (1) without contact by means of electromagnetic oscillations and optionally receives information, wherein the sent-out information contains the data whose content corresponds to the data/information contents of magnetic strip cards, so that when the chip card (4) is manually held in close proximity to a read/write terminal (1), it causes the terminal to transfer the data of the chip card (4) to remotely located devices in the same form as it is also transferred by magnetic strip card reading devices and, due to the fact that the transmitted information is identical or similar, this remotely located device is not capable of distinguishing whether the information comes from a magnetic strip card or from a chip card, wherein a component of the chip card contains data corresponding to several different codes of magnetic strip card data, so that the chip card is suited to fulfill different requirements of different read/write terminals or different programs which are each associated with different encoding, and wherein the chip card is constructed to transfer the different coding through a contact-free segment.

39. Device consisting of a read/write terminal (1) for exchanging energy and data with a chip card (4) comprising a chip card having a magnetic strip and coils (12) or condensers;

a read/write terminal (1) having means for energized connection and/or communication with the contact connections (6) and/or with the coils (12) or condensers of a chip card (4) as well as a magnetic strip reading device for reading the magnetic strip (11) of the chip card (4), and in this manner, information can be read from the magnetic strip (11) and can be written into or read out of the chip card via the contact connections (6) and/or coils (12) and/or condensers by means of the read/write terminal (1); and a component of the chip card, wherein the component of the chip card contains data corresponding to several different codes of magnetic strip card data, so that the chip card is suited to fulfill different requirements of different read/write terminals or different programs which are each associated with different encoding, and wherein the chip card is constructed to transfer the different coding through a contact-free segment.

40. A method for exchanging energy and data between a read/write terminal and a chip card having contactless connections, entering magnetic strip type data into a component of the chip card, wherein the component of the chip card contains data corresponding to several different codes of magnetic strip card data, so that the chip card is suited to fulfill different requirements of different read/write terminals or different programs which are each associated with different encoding, and wherein the chip card is constructed to transfer the different coding through a contact-free segment;

holding the chip card manually in close proximity to the read/write terminal;

allowing the chip card to reach a minimum value of the energy level of the electromagnetic alternating field of the read/write terminal;

transferring energy and data without contact between the read/write terminal and the chip card by means of electromagnetic alternating fields;

causing thereby the terminal to transfer the data of the chip card to remotely located devices in the same form as it is also transferred by magnetic strip card reading devices; autonomously activating said chip card by itself with at least one circuit part of the electronic circuit of the chip card;

sending out information upon activation of this circuit part to the read/write terminal without contact by means of electromagnetic oscillations, wherein the sent-out information contains the data whose content corresponds to the data/information contents of magnetic strip cards.

41. Process for exchanging energy and data between a read/write terminal (1) and a chip card (4) with contactless connections, wherein energy and magnetic strip data are transferred without contact from the read/write terminal (1) to the chip card (4) by means of electromagnetic alternating fields interacting with two coils (12), and wherein energy and magnetic strip data are transferred without contact or with contact from the chip card (4) to the read/write terminal (1) by means of electromagnetic alternating fields when the chip card is near the read/write terminal, and when the chip card (4) reaches a minimum value of the energy level of the electromagnetic alternating field of the read/write terminal (1), said chip card autonomously activates itself with at least one circuit part (2) of its electronic circuit, wherein upon activation, this circuit part (2) sends out information to the read/write terminal (1) without contact by means of electromagnetic oscillations, wherein the sent-out information contains the data whose content corresponds to the data/information contents of magnetic strip cards, so that when the chip card (4) is manually held in close proximity to a read/write terminal (1), it causes the terminal to transfer the data of the chip card (4) to remotely located devices in the same form as it is also transferred by magnetic strip card reading devices and, due to the fact that the transmitted information is identical or similar, wherein this remotely located device needs not distinguish whether the information comes from a magnetic strip card or from a chip card, wherein contactless reading in of the magnetic strip information (8) to be electromagnetically transferred takes place in the circuit part (2) of the chip card (4) via the two coils (12) with which the chip card (4) can autonomously detect electronically whether it is in the vicinity of or far away from a read/write terminal (1) and, as a function of this detection, the reception of magnetic strip information to be entered is switched on or of.

42. Process for exchanging energy and data between a read/write terminal (1) and a chip card (4) with contactless connections, wherein energy and magnetic strip data are transferred without contact from the read/write terminal (1) to the chip card (4) by means of electromagnetic alternating fields interacting with two coils (12) and wherein energy and magnetic strip data are transferred without contact or with contact from the chip card (4) to the read/write terminal (1) by means of electromagnetic alternating fields when the chip card is near the read/write terminal, and when the chip card (4) reaches a minimum value of the energy level of the electromagnetic alternating field of the read/write terminal (1), said chip card autonomously activates itself with at least one circuit part (2) of its electronic circuit, wherein upon activation, this circuit part (2) sends out information to the read/write terminal (1) without contact by means of electromagnetic oscillations, whereby the sent-out information contains the data whose content corresponds to the data/information contents of magnetic strip cards, so that when the chip card (4) is manually held in close proximity to a read/write terminal (1), it causes the terminal to transfer the data of the chip card (4) to remotely located devices in the same form as it is also transferred by magnetic strip card reading devices and, due to the fact that the transmitted information is identical or similar, wherein this remotely located device needs not distinguish whether the information comes from a magnetic strip card or from a chip card, wherein the circuit part (2) of the chip card (4), depending on the source of its activation, is arranged in such a way that, on the one hand, in the case of contact-free electromagnetic activation, the circuit part (2) exclusively transfers the data without contact, corresponding to magnetic strip card data from the component (3), whereby any form of contact-free storage of data into the component (3) is blocked by electronic circuit means inside the chip card (4), and on the other hand, through the two coils (12), the circuit part (2) is opened for reading in data corresponding to magnetic strip card data.

43. Device consisting of a read/write terminal (1) for exchanging energy and data with a chip card (4) wherein the read/write terminal (1) has means for energized connection and/or communication with two coils (12) of the chip card (4) as well as a magnetic strip reading device for reading the magnetic strip (11) of the chip card (4), and in this manner, magnetic strip formatted information can be written into the chip card via the two coils (12) by means of the read/write terminal (1) and magnetic strip formatted information can be read from the magnetic strip (11) and can be read out of the chip card through the two coils (12) by means of the read/write terminal (1), wherein the component for data reception (10) through the two coils (12) and for contactless data transmission (8) of the circuit part (2) of the chip card (4) has an electronic memory (3).

44. A method for exchanging energy and data between a read/write terminal and a chip card having contactless connections and two coils for emitting and receiving electromagnetic radiation;

holding the chip card manually in close proximity to the read/write terminal;

allowing the chip card to reach a minimum value of the energy level of the electromagnetic alternating field of the read/write terminal;

transferring energy and magnetic strip data without contact from the read/write terminal to the two coils of the chip card by means of electromagnetic alternating fields for activating the chip card, wherein a contactless reading in of the magnetic strip information (8) to be electromagnetically transferred takes place in the circuit part (2) of the chip card (4) via the two coils (12) with which the chip card (4) can autonomously detect electronically whether it is in the vicinity of or far away from a read/write terminal (1) and, as a function of this detection, the reception of magnetic strip information to be entered is switched on or off;

transferring energy and magnetic strip data without contact from the chip card to the read/write terminal by means of electromagnetic alternating fields emitted by the two coils; causing thereby the terminal to transfer the data of the chip card to remotely located devices in the same form as it is also transferred by magnetic strip card reading devices; autonomously activating said chip card by itself with at least one circuit part of the electronic circuit of the chip card;

sending out information upon activation of this circuit part to the read/write terminal without contact by means of electromagnetic oscillations, wherein the sent-out information contains the data whose content corresponds to the data/information contents of magnetic strip cards.

45. A method for exchanging energy and data between a read/write terminal and a chip card having contactless connections and two coils for emitting and receiving electromagnetic radiation;

holding the chip card manually in close proximity to the read/write terminal;

allowing the chip card to reach a minimum value of the energy level of the electromagnetic alternating field of the read/write terminal;

transferring energy and magnetic strip data without contact from the read/write terminal to the two coils of the chip card by means of electromagnetic alternating fields for activating the chip card, wherein upon activation through the two coils (12), the circuit part (2) is opened for reading in data corresponding to magnetic strip card data; transferring energy and magnetic strip data without contact from the chip card to the read/write terminal by means of electromagnetic alternating fields emitted by the two coils, wherein the circuit part (2) of the chip card (4), depending on the source of its activation, is arranged in such a way that, on the one hand, in the case of contact-free electromagnetic activation, the circuit part (2) exclusively transfers the data without contact, corresponding to magnetic strip card data from the component (3), whereby any form of contact-free storage of data into the component (3) is blocked by electronic circuit means inside the chip card (4);

causing thereby the terminal to transfer the data of the chip card to remotely located devices in the same form as it is also transferred by magnetic strip card reading devices; autonomously activating said chip card by itself with at least one circuit part of the electronic circuit of the chip card;

sending out information upon activation of this circuit part to the read/write terminal with out contact by means of electromagnetic oscillations, wherein the sent-out information contains the data whose content corresponds to the data/information contents of magnetic strip cards.

46. A chip card data exchange device comprising a chip card having a magnetic strip and two coils;

a read/write terminal having means for energized connection and/or communication with two coils of the chip card, and having a magnetic strip reading device for reading the magnetic strip of the chip card for exchanging energy and data with a chip card, for writing magnetic strip formatted information into the chip card through the two coils of the chip card, and for reading magnetic strip formatted information from the magnetic strip through the two coils of the chip card.

47. A chip card comprising a chip card substrate;

an electronic memory disposed on the chip card substrate;

a circuit part disposed on the chip card substrate and connected to the electronic memory;

two coils disposed on the chip card substrate and connected to the circuit part for receiving and emitting electromagnetic radiation and for entering magnetic strip type information into the electronic memory and furnishing a contactless transfer element disposed on the chip card substrate, wherein the contactless transfer element employing emission of electromagnetic waves provides a reading path for magnetic strip type information present in the electronic memory.

* * * * *